(12) United States Patent
Pryszo et al.

(10) Patent No.: US 8,620,106 B2
(45) Date of Patent: Dec. 31, 2013

(54) CHART DISPLAY DEVICE AND METHOD FOR DISPLAYING CHART

(75) Inventors: Brice Pryszo, Bidart (FR); Iker Pryszo, Bidart (FR); Mathieu Jacquinot, Bidart (FR); Olivier Robin, Bidart (FR); Makoto Obuchi, Nishinomiya (JP); Koji Tokuda, Nishinomiya (JP)

(73) Assignees: Furuno Electric Co., Ltd., Nishinomiya (JP); Maxsea International S.A.S., Bidart (FR)

( * ) Notice: Subject to any disclaimer, the term of this patent is extended or adjusted under 35 U.S.C. 154(b) by 1165 days.

(21) Appl. No.: 12/201,953

(22) Filed: Aug. 29, 2008

(65) Prior Publication Data

US 2009/0067750 A1 Mar. 12, 2009

Related U.S. Application Data

(60) Provisional application No. 60/935,823, filed on Aug. 31, 2007.

(51) Int. Cl.
*G06K 9/36* (2006.01)

(52) U.S. Cl.
USPC .............................. 382/284; 382/100; 382/294

(58) Field of Classification Search
USPC .......................................................... 382/294
See application file for complete search history.

(56) References Cited

U.S. PATENT DOCUMENTS

| | | | |
|---|---|---|---|
| 4,692,880 A * | 9/1987 | Merz et al. ...................... 345/587 |
| 5,379,129 A * | 1/1995 | Othmer et al. ................. 358/450 |
| 5,409,379 A * | 4/1995 | Montag et al. ..................... 434/2 |
| 6,009,188 A * | 12/1999 | Cohen et al. ................... 382/154 |
| 7,271,814 B2 * | 9/2007 | Anwar et al. .................. 345/629 |
| 7,436,405 B2 * | 10/2008 | Losasso Petterson et al. .............................. 345/428 |
| 7,532,770 B2 * | 5/2009 | Pfister ............................ 382/284 |
| 7,532,771 B2 * | 5/2009 | Taylor et al. ................... 382/284 |
| 7,567,260 B2 * | 7/2009 | Hamburg ....................... 345/629 |
| 7,633,511 B2 * | 12/2009 | Shum et al. .................... 345/628 |
| 7,711,162 B2 * | 5/2010 | Li .................................... 382/128 |
| 8,217,957 B1 * | 7/2012 | Isaacson ........................ 345/587 |
| 8,411,113 B1 * | 4/2013 | Cornell et al. ................ 345/629 |
| 2002/0061131 A1 * | 5/2002 | Sawhney et al. .............. 382/154 |
| 2003/0011610 A1 * | 1/2003 | Kitsutaka ....................... 345/582 |
| 2003/0235344 A1 * | 12/2003 | Kang et al. ..................... 382/284 |
| 2005/0057574 A1 * | 3/2005 | Andrews ........................ 345/592 |
| 2006/0104542 A1 * | 5/2006 | Blake et al. .................... 382/284 |
| 2007/0071341 A1 * | 3/2007 | Pfister ............................ 382/254 |
| 2007/0236507 A1 * | 10/2007 | Tigges ............................ 345/592 |

FOREIGN PATENT DOCUMENTS

| | | | | |
|---|---|---|---|---|
| EP | 1729256 A1 | | 12/2006 | |
| EP | 1729256 A1 * | | 12/2006 | ................ G06T 3/40 |

OTHER PUBLICATIONS

Carsten Daschsbacher et al., "Height-Field Synthesis by Non-Parametric Sampling", Nov 18, 2005, VMV, p. 1-6.*

(Continued)

*Primary Examiner* — Gandhi Thirugnanam
(74) *Attorney, Agent, or Firm* — Birch, Stewart, Kolasch & Birch, LLP

(57) ABSTRACT

Methods and apparatuses perform image processing for blending image and/or data layers. The method according to one embodiment accesses data representing a first layer and data representing a second layer; and generates a blended layer by adjusting a transparency of said first layer relatively to said second layer based on data associated with said first or second layer.

33 Claims, 8 Drawing Sheets

(56) References Cited

OTHER PUBLICATIONS

Anonymous, "Become a layer-blending expert", Dec. 31, 2003, pp. 1-3, http://www.adobe.com/designcenter/photoshop/articles/phs8advblend/phs8advblend.pdf (retrieved from Internet on Apr. 8, 2009), XP002524044.

Anonymous, "Navionics Platinum Chart Card—User's Guide", Jun. 30, 2005, pp. 1-29, http://www.raymarine.com/submittedfiles/handbooks/e_series/81259_1_NGC.pdf, (retrieved from Internet on Apr. 11, 2009), XP002524045.

Anonymous, "Raymarine—Raytech RNS", Dec. 31, 2006, Chapters 5 and 6, pp. 1-16, http://www.raymarine.com/SubmittedFiles/Handbooks/raytech/RayTechRNS6_Handbook.pdf, (retrieved from Internet on Apr. 11, 2009), XP0025224046.

Adam Cort, "Eletronic Charts", Sailing, Dec. 31, 2004, pp. 1-3, http://www.gpsnavx.com/pdf/Sailing.pdf, (retrieved from Internet on Apr. 14, 2009), XP002524047.

Anonymous, "Furuno-NavNet 3D", Nov. 8, 2007, pp. 1-2, http://www.naucat.com/vijesti/category/asp?GID=2&1an=en&idVijesti=1258>, (retrieved from Internet on Apr. 9, 2009), XP002524048.

International Preliminary Report on Patentability (IPRP) dated Mar. 2, 2010, of Corresponding International Application No. PCT/IB2008/002187.

UKIPO Office Action dated Jan. 24, 2012 of Corresponding Foreign Application No. GB0917484.8.

* cited by examiner

CHART

CHART DISPLAY DEVICE AND METHOD FOR DISPLAYING CHART

The present application claims priority under 35 USC §119 (e) to U.S. Provisional Application No. 60/935,823 filed Aug. 31, 2007, which is hereby incorporated by reference herein in its entirety.

BACKGROUND OF THE INVENTION

1. Field of the Invention

The present invention is related to chart display devices, and more particularly to a chart display device for displaying a photograph for land and marine use.

2. Description of the Related Art

When an aerial photograph is overlaid on a chart using typical/conventional methods to obtain an image for use in survey applications, for example, the aerial photograph, the chart, a travel route to a destination and other navigational information on the chart may be displayed in the image. When the travel route on the chart is displayed on the photograph, it may stand out from the aerial photograph depending on how it is displayed. In such a case, information items displayed on the chart, other than the travel route, are difficult to recognize, due to an overload of displayed information.

Disclosed embodiments of this application address these and other issues by displaying an image formed from multiple layers, such as aerial or satellite photograph layers and chart layers associated with land and sea areas, by blending the aerial photographs and the chart with variable transparency values. The transparency values may be obtained based on pixel data associated with one or more layers. Alpha blending technology may be used to obtain transparency values pixels using a depth or altitude database for pixels' depths or altitudes. When a first layer is an aerial or satellite photo and a second layer is a chart, a portion of the photo is provided over a land area, a portion of the chart is provided over a deep sea area, and a blended portion obtained from the photo and the chart is provided in a shallow sea area.

SUMMARY OF THE INVENTION

The present invention is directed to methods and apparatuses for processing images for blending image and/or data layers. According to a first aspect of the present invention, an image processing method comprises: accessing data representing a first layer and data representing a second layer; and generating a blended layer by adjusting a transparency of the first layer relatively to the second layer based on data associated with the first or second layer.

According to a second aspect of the present invention, an image processing apparatus comprises: an image data input unit for accessing data representing a first layer and data representing a second layer; and a blending unit for generating a blended layer by adjusting a transparency of the first layer relatively to the second layer based on data associated with the first or second layer.

According to a third aspect of the present invention, a chart display method comprises: accessing data representing a photo and data representing a chart; generating a blended data by adjusting a transparency depending on a depth value associated with every pixel in the photo or chart; and displaying the blended data.

According to a fourth aspect of the present invention, a chart display apparatus comprises: an image data accessing unit for accessing data representing a photo and data representing a chart; a blending unit for generating a blended data by adjusting a transparency depending on a depth value associated with every pixel in the photo or chart; and a displaying unit for displaying the blended data.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Aspects of the invention are more specifically set forth in the accompanying description with reference to the appended figures.

In one aspect, the present invention relates to methods and apparatuses that display an image that includes multiple layers, such as aerial or satellite photograph layers and chart layers associated with land and sea areas. Methods and apparatuses of the present invention display aerial photographs in the land area, a travel route to a destination, and a chart in a sea area. The aerial photographs and the chart are blended with variable transparency values, so that information items displayed on the aerial photographs and on the chart are clear and recognizable without difficulty.

Figure 3:
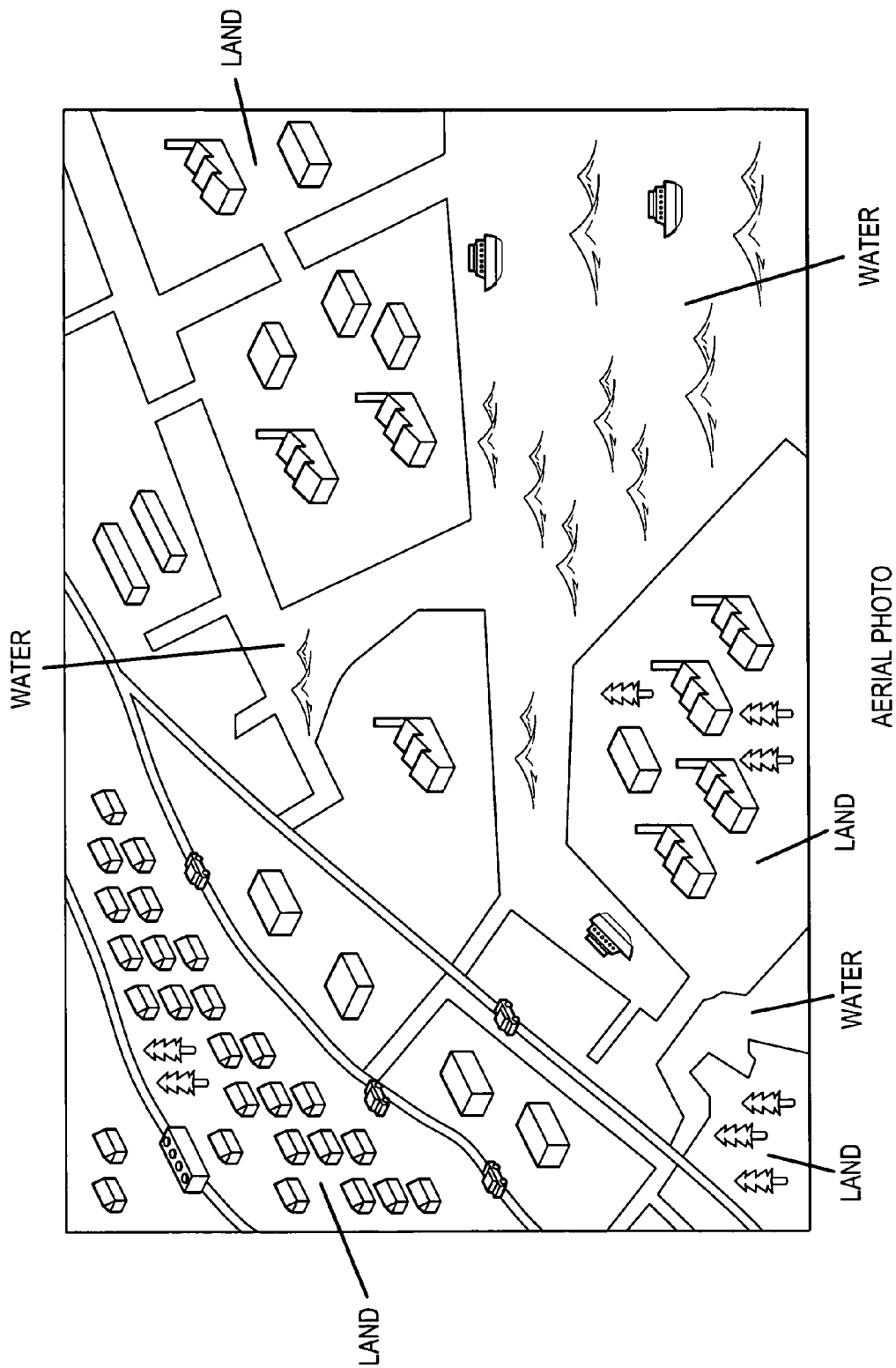
FIG. 3 is an exemplary view of an aerial photo.
Figure 4:
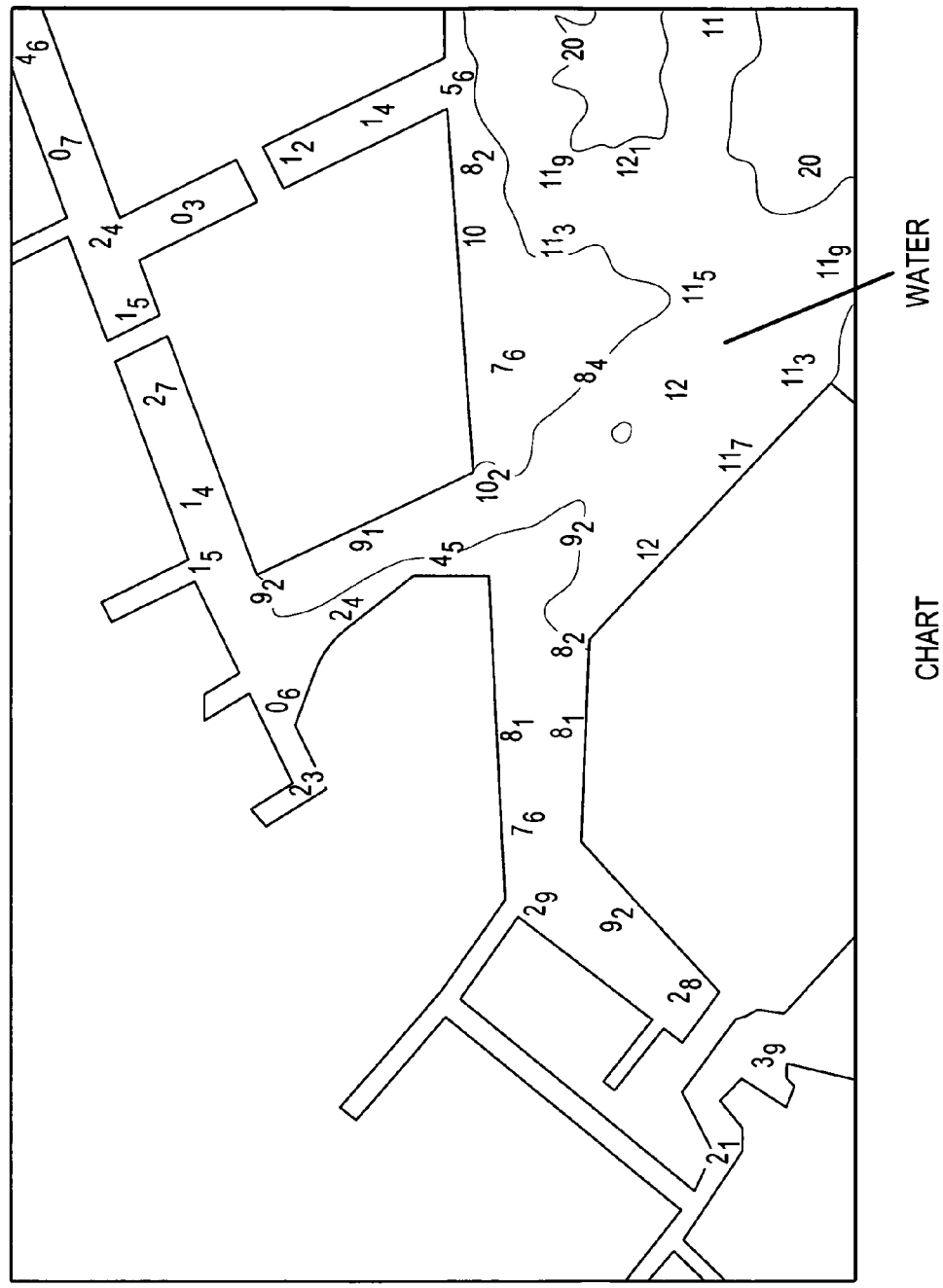
FIG. 4 is an exemplary view of a chart.

FIG. 3 is an example view of an aerial photo. As shown in FIG. 3, an aerial photo illustrates land areas, water areas, and objects on land or water. FIG. 4 is an example view of a chart.

Figure 5:
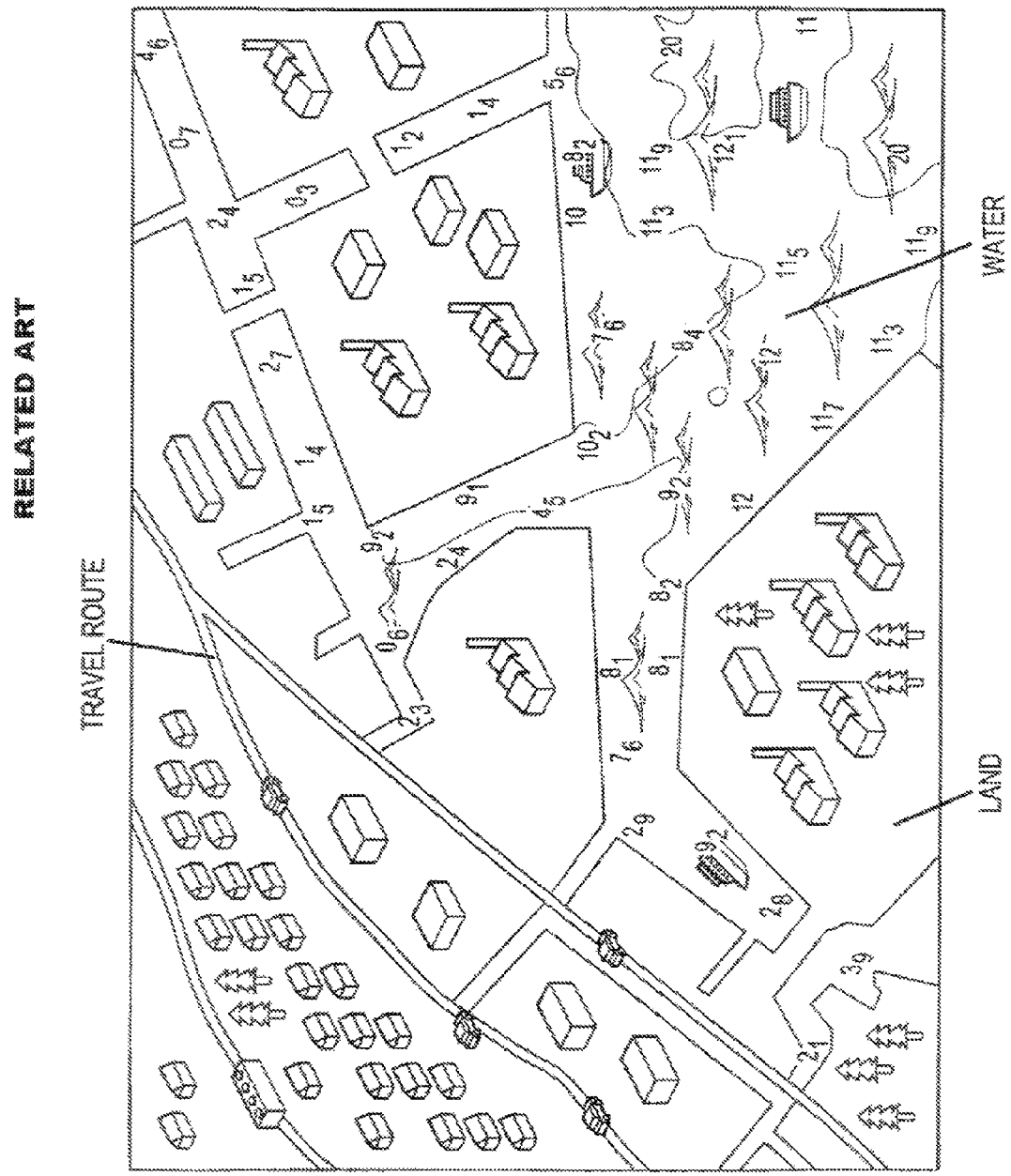
FIG. 5 is a view of an aerial photo overlaid on a chart in accordance with the conventional art.

FIG. 5 is an example view of an aerial photo overlaid on a chart according to the conventional art. FIG. 5 displays the aerial photograph of FIG. 3 and the chart of FIG. 4. Images such as the image in FIG. 5 may be used for marine operations, and include aerial photographs, charts, a travel route to a destination, and other navigational information on the chart. When the travel route on the chart is displayed on the photograph, it may stand out from the aerial photograph depending on how it is displayed. In such a case, information items displayed on the chart other than the travel route are difficult to recognize, due to an overload of displayed information.

To address these and other problems, the present invention implements methods and apparatuses that display an image that includes multiple layers, such as aerial or satellite photograph layers and chart layers associated with land and sea areas, where the aerial photographs and the chart are blended with variable transparency values, so that information items displayed on the aerial photographs and on the chart are recognizable without difficulty.

Figure 1:
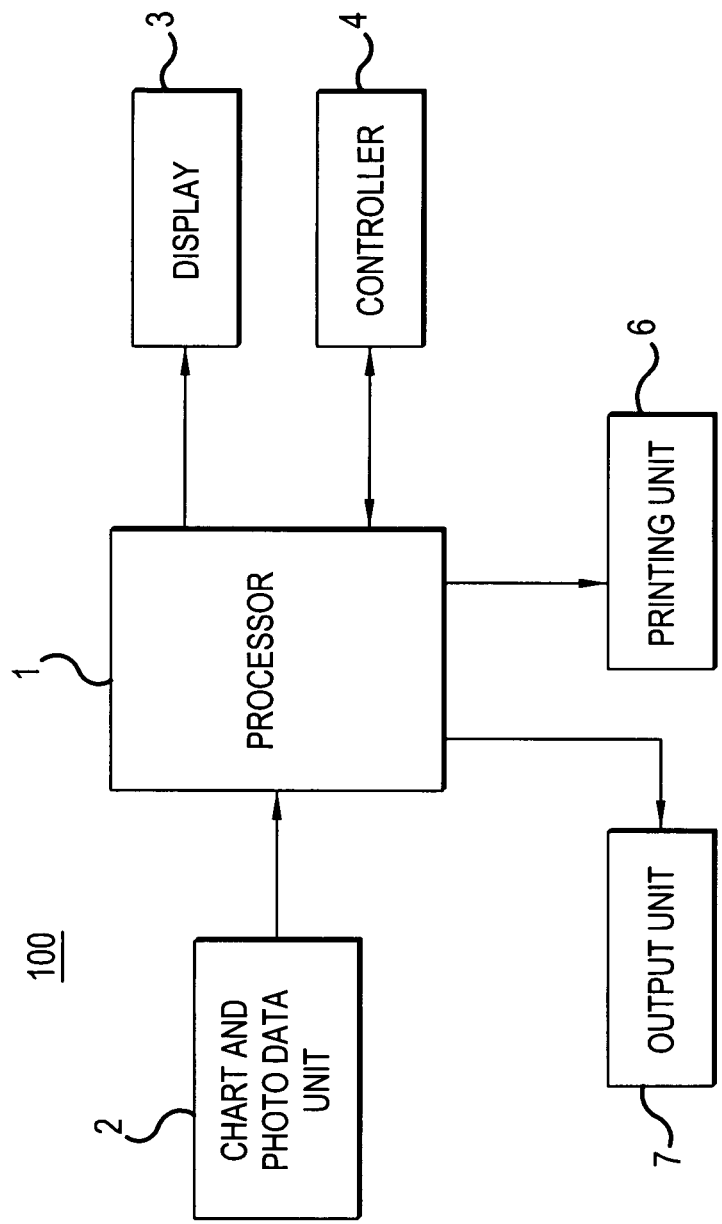
FIG. 1 is a general block diagram of a navigation system according to an embodiment of the present invention.

FIG. 1 is a block diagram of a navigation system 100 according to an embodiment of the present invention. The navigation system 100 illustrated in FIG. 1 includes the following components: a processor 1; a chart and photo data unit 2; a display 3; a controller 4; a printing unit 6; and an output unit 7. Operation of the navigation system 100 in FIG. 1 will become apparent from the following discussion.

Processor 1 receives chart and photo data from the chart and photo data unit 2. Controller 4 controls how the received chart data and photo data are displayed. Based on controller commands, processor 1 displays a blended image using chart and photo data, on display 3. Chart and photo data unit 2 may be one or more of any number of devices providing chart and photo data. Such an input device may be, for example, a scanner for scanning images; a digital camera; a recording medium such as a CD-R, a floppy disk, a USB drive, etc.; a database system which stores images, photographs or charts; a network connection; an image processing system that outputs digital data, such as a computer application that processes chart and/or photo data; etc.

A user, e.g., a navigation specialist, may view the output of processor 1 or controller 4 via display 3 and may input commands to the processor 1 or controller 4 via a user input unit (not shown). A user input unit may include a keyboard and a mouse, but other conventional input devices could also be used.

According to the embodiment illustrated in FIG. 1, the navigation system 100 may display aerial photographs in the land, a travel route to a destination, and a chart of the sea. In an exemplary embodiment, the aerial photographs are overlapped with the chart translucently in shallow sea regions. On the other hand, no aerial photograph is displayed on the chart in deeper sea regions.

In a preferred embodiment, deeper sea regions may be set to be regions deeper than approximately 10 m.

With a display method and apparatus according to an exemplary embodiment of the present invention, information items displayed on the chart and which are different from a travel route are recognizable without difficulty. In addition, channels (which are areas of relatively deep water) located along seacoasts (which usually are regions of globally shallow water) are clearly identified.

In addition to performing blending of aerial photographs and charts in accordance with embodiments of the present invention, the processor 1 and controller 4 may perform additional image processing functions in accordance with commands received from a user input unit.

A printing unit 6 may receive the output of the processor 1 and may generate a hard copy of the processed photo and chart data. In addition or as an alternative to generating a hard copy of the output of the processor 1, the processed image data may be returned as an image file, e.g., via a portable recording medium or via a network (not shown). The output of processor 1 may also be sent to output unit 7 that performs further operations on the photo and chart data for various purposes. The output unit 7 may be a module that performs further processing of the image data, a database that collects and compares blended photo and chart data, etc.

Although the various components of FIG. 1 are illustrated as discrete elements, such an illustration is for ease of explanation and it should be recognized that certain operations of the various components may be performed by the same physical device, e.g., by one or more microprocessors.

Chart and photo data unit 2, processor 1 and controller 4 may be software systems/applications, hardware, purpose built hardware such as FPGA, ASIC, etc.

Figure 2A:
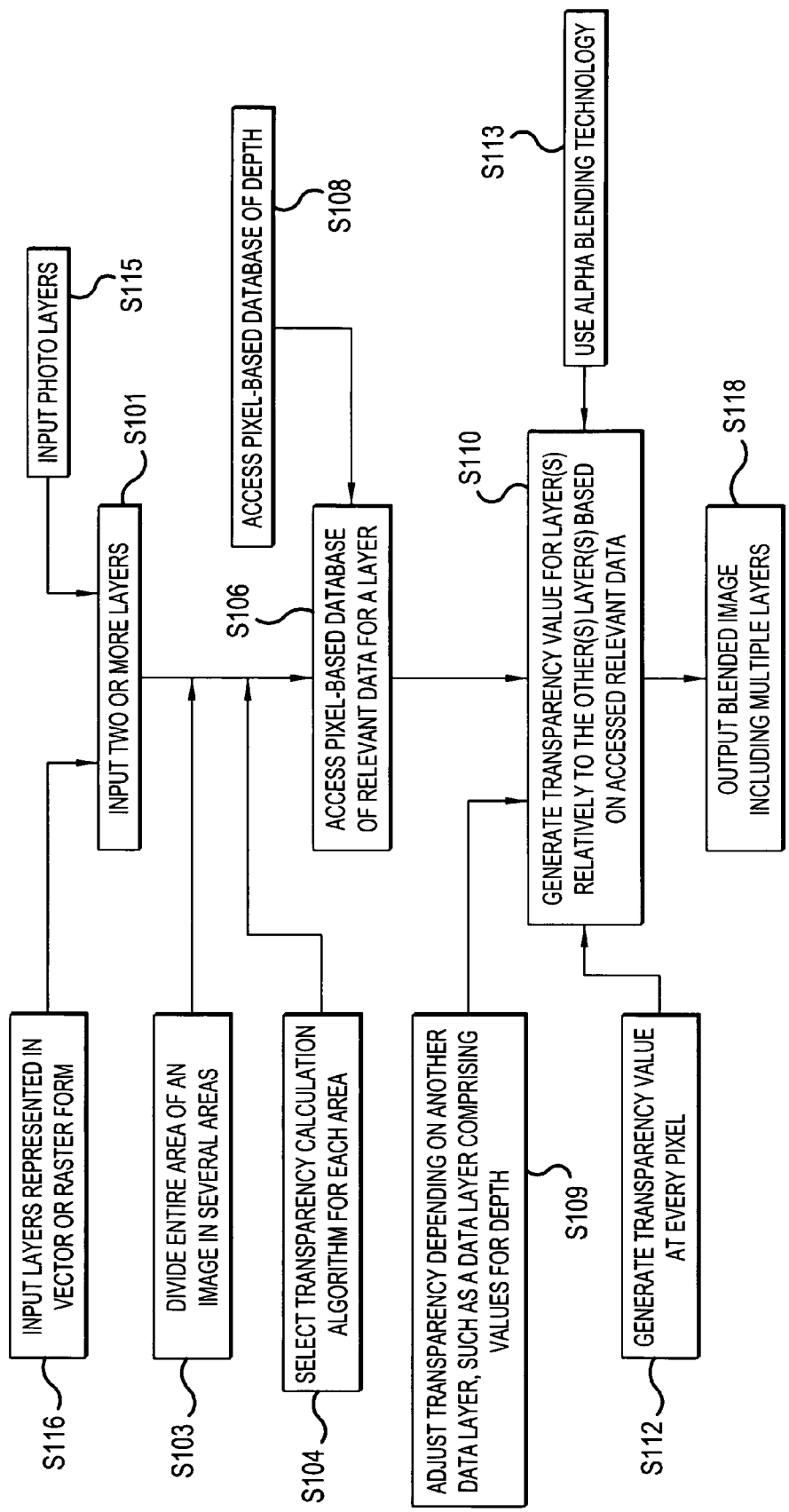
FIG. 2A is a flow diagram illustrating operations performed in a blending process by a navigation system according to an embodiment of the present invention illustrated in FIG. 1.

FIG. 2A is a flow diagram illustrating operations performed in a blending process by a navigation system 100 according to an embodiment of the present invention illustrated in FIG. 1.

FIG. 2A illustrates steps for blending two or more layers for an output image. The blended layers may be, for example, two or more geo-referenced layers. In an exemplary embodiment, one of these layers may be a satellite photo or an aerial photo, and other layer(s) may be chart layer(s), which could be represented in vector or raster form (S101, S115, S116). The blending procedure implemented by an embodiment of the present invention is a technique by which transparency of one or several layers is created relatively to the other(s) layer(s) (S110). The flow diagram in FIG. 2A describes how to blend layers using a transparency factor. Transparency for a layer may be expressed in percentage, where 0% signifies that the layer is opaque, 100% signifies that the layer is "invisible (transparent)", and a transparency percentage between 1% and 99% signifies that the layer is translucent.

In typical/conventional methods, transparency is setup automatically or by a user setup, so that transparency is applied consistently where two layers overlap. In other words, the transparency of an overlapped area of two layers has a fixed value, or a value that can be changed by a user menu.

Embodiments of the present invention automatically adjust transparency depending on another data layer, such as a data layer comprising values for depth.

To implement the blending method of the present invention, a transparency controller is implemented. In an exemplary embodiment, the transparency controller may set a transparency value at every pixel on the screen (S112). Furthermore, a pixel-based depth database is used (S108). A transparency controller and a pixel-based depth database did not exist in typical/conventional methods.

In an embodiment of the present invention, a pixel-based depth database is generated from existing data associated with a chart. In a preferred embodiment, a pixel-based depth database is generated by calculating interpolation values between known points. As seen in FIG. 4, a chart may include some values for depth derived from the chart, however, these values are scattered and dotted about on the chart at certain distances in between. Hence, such data or values associated with a chart do not form a pixel-based depth database. In an embodiment of the present invention, a pixel-based depth database is obtained by calculating depth at every pixel by interpolation between some known points on a chart. With this technique, every pixel in a display acquires its own depth or depth database.

To blend two or more layers, alpha blending technology is used in the present invention in an exemplary embodiment (S113). An alpha value is calculated at each pixel. The alpha value depends on relevant data at each pixel location. For example, the alpha value depends on the depth value (or any other relevant data) at each pixel location. Various algorithms may be used to derive an alpha value from a depth value, Depth values may be derived from a depth database.

In addition, an entire area of an image may be divided in several areas (S103). As many areas as needed may be obtained. Each area may be specified by an associated range of depth or altitude between a limit value A and a limit value B. In an exemplary embodiment, the limit A of a first area could be infinite altitude, and the limit B of the last area could be infinite depth. Furthermore, the transparency calculation algorithm used for one area may be different from the transparency calculation algorithm used for another area. Hence, a different transparency algorithm may be associated with each area (S104).

Figure 2B:
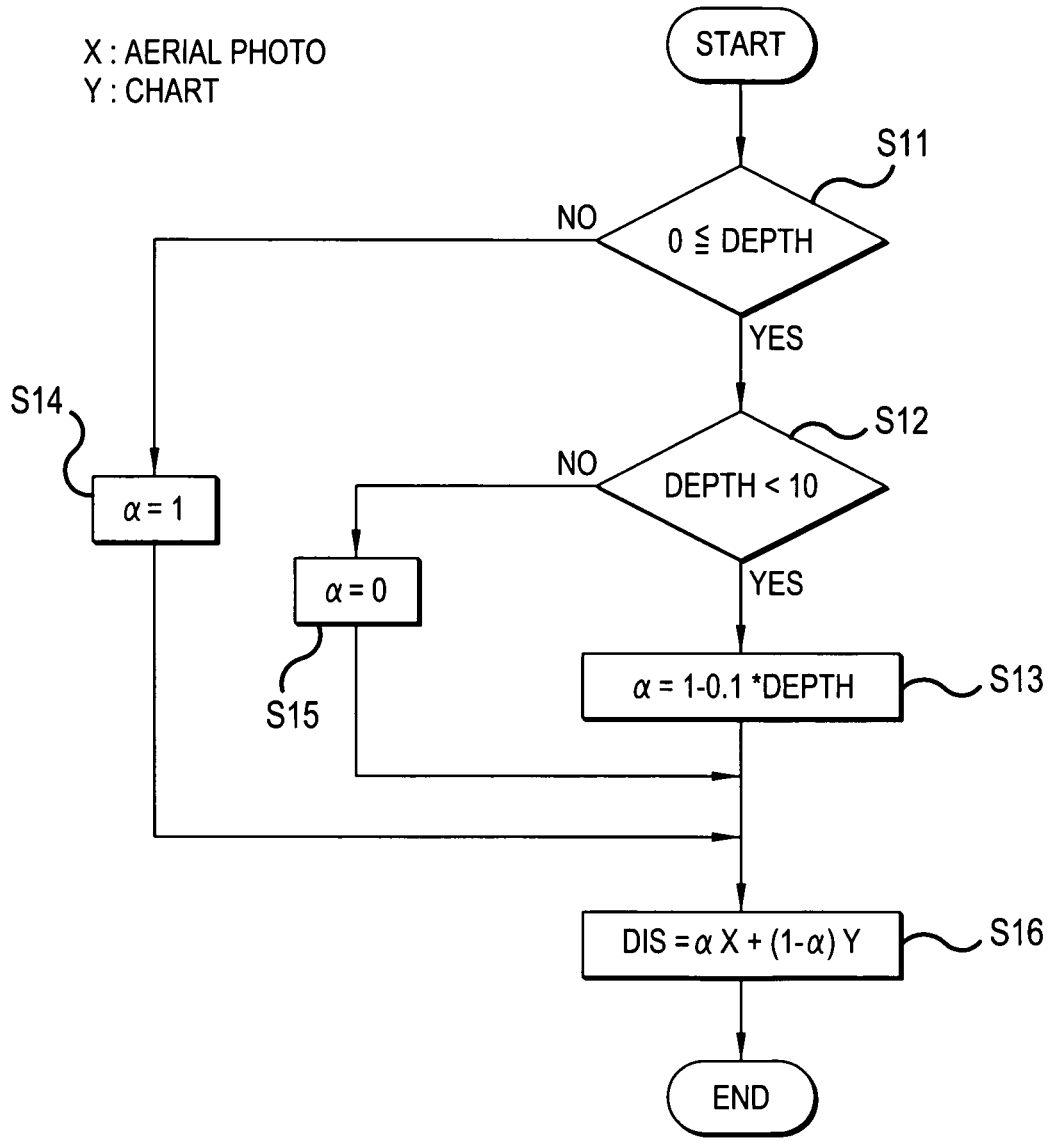
FIG. 2B is an exemplary flow diagram illustrating operations performed in a blending process by a navigation system according to an embodiment of the present invention illustrated in FIG. 1.

FIG. 2B is an exemplary flow diagram illustrating operations performed in a blending process by a navigation system according to an embodiment of the present invention illustrated in FIG. 1. FIG. 2B illustrates a layer blending process for three exemplary areas: a land area, a first sea area between 0 m and 10 m, and a second sea area deeper than 10 m. For each area, the value of the transparency applied (between 0% and 100%) may be calculated by one of the following two methods:

1) Transparency is fixed for an entire area. For example, on a land area, no transparency or a low transparency value may be used. This level of transparency may be automatically attributed by software, or may be set up by a user.
2) Transparency at a specific point of another area is variable depending on the depth/altitude of this point. The value of transparency at a limit (point) A and at a limit (point) B of the area may be automatically attributed by software or may be setup by a user. The process also applies an algorithm in order to define transparency at any specific point of the area. The algorithm may be a linear function, or other mathematical function that uses the depth/altitude database for pixels' depths/altitudes. At each specific point in the area, the algorithm depends on the depth/altitude of the specific point, the transparency value at limit (point) A, and the transparency value at limit (point) B of the area.

In FIG. 2B, an aerial photo X and a chart Y are blended in an image, using depth information. As illustrated in FIG. 2B, a test is performed to determine if the depth in a region, or at one pixel, is positive (S11). If the depth is not positive, then the region tested has no depth, hence the tested region represents an area of raised land (raised above sea level, for example). In that case, only the aerial photograph X is displayed over that region. The displayed image Dis for the region is then Dis=$\alpha$X+(1−$\alpha$)Y (S16), where $\alpha$=1 (S14), hence Dis=X=the aerial photo.

If the depth is positive (the Yes branch at step S11), then the area is either a flat area (zero depth), a shallow water region, or a deep water region. In an exemplary embodiment, deep sea regions may be set to be regions deeper than approximately 10 m, but other values may also be used instead of 10 m.

For the exemplary value of 10 m, a test is performed to determine of the depth of the tested region is less than 10 m (S12). If the depth is larger than 10 m (the No branch at step S12), then the tested region is a deep sea region, and no aerial photograph is displayed there. Only the chart is displayed in a deep sea region. In other words, the parameter $\alpha$ is set to zero (S15), and the displayed image Dis for the tested region is Dis=$\alpha$X+(1−$\alpha$)Y=Y=Chart (S16).

If the depth of the tested region is between 0 and 10 m, then the region is a shallow sea region. In this case, the parameter $\alpha$ is set to $\alpha$=1−0.1 * Depth (S13), and the displayed image Dis for the tested region is
Dis=$\alpha$X+(1−$\alpha$)Y=(1−0.1 * Depth) * X+0.1 * Depth * Y (S16). Hence, the aerial photograph X is overlapped with the chart Y translucently in a shallow sea region. In a shallow sea region of higher depth, where, for example, depth approaches 10 m, $\alpha$ is smaller and approaches 0. Therefore, the displayed image Dis for the tested region Dis=$\alpha$X+(1−$\alpha$)Y has a larger contribution from the chart Y and a smaller contribution from the aerial photo X.

On the other hand, in a very shallow sea region of small depth where, for example, depth approaches 0 m, $\alpha$ is larger and approaches 1, and therefore the displayed image Dis for the tested region Dis=$\alpha$X+(1−$\alpha$)Y has a larger contribution from the aerial photo X and a smaller contribution from the chart Y.

With the blending procedure illustrated in FIG. 2B, one of two layers X and Y is more visible at a specific location, depending on the depth at that location. For example, a satellite picture or an aerial photo is very visible on shallow water areas. On the other hand, the chart is most visible over deep water areas. In addition, channels (which are relatively deep water areas) located along sea coasts (which are globally shallow water areas) are clearly identified with the method illustrated in FIG. 2B.

Other depth values for shallow water regions and deep water regions may also be used. Additionally, the photo data and chart data may be divided into more regions than deep water region, shallow water region and land region. Transparency factors may be associated with every region.

Figure 6:
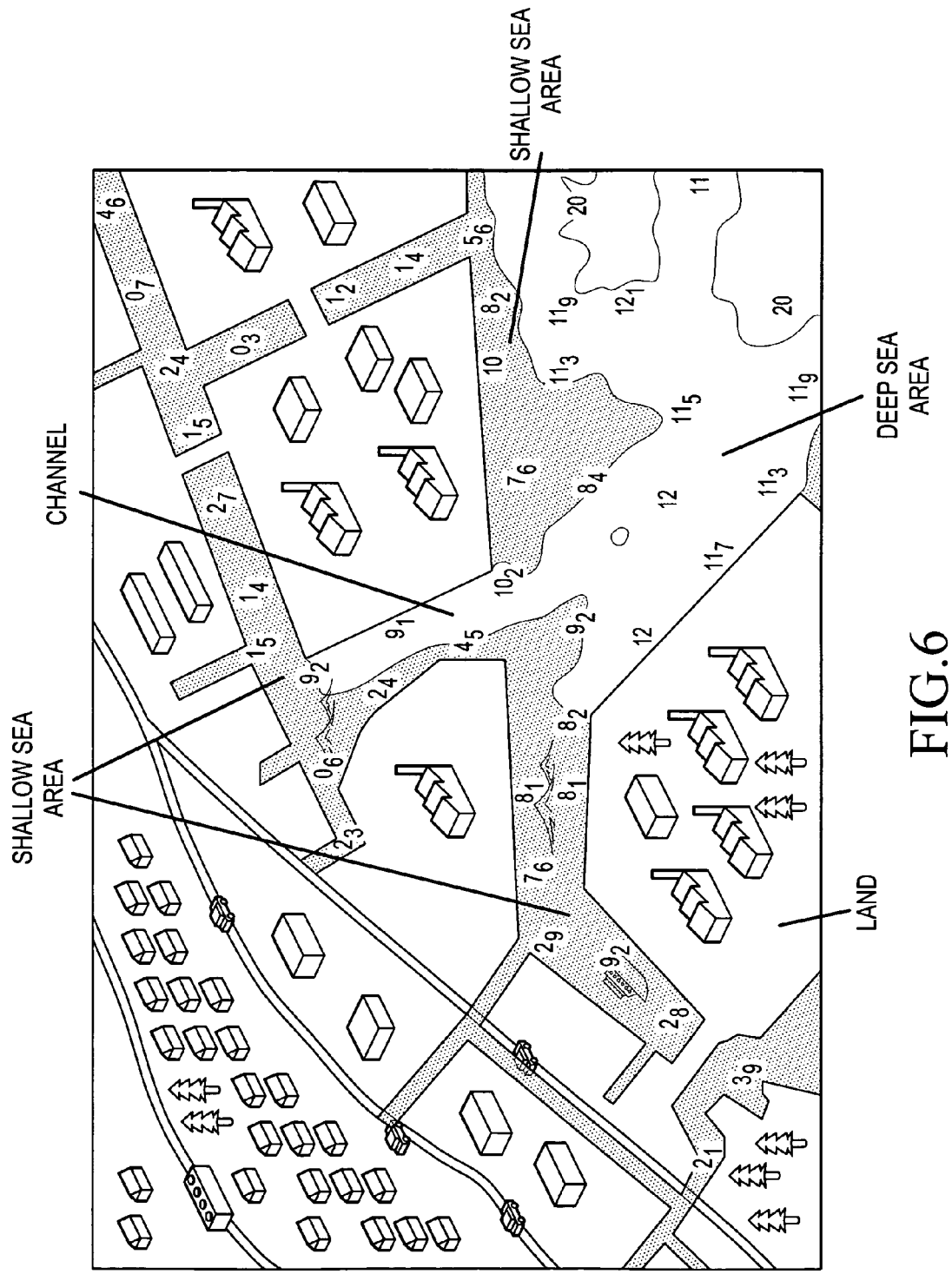
FIG. 6 is an exemplary view of an aerial photo overlaid on a chart by a navigation system according to an embodiment of the present invention.
Figure 7:
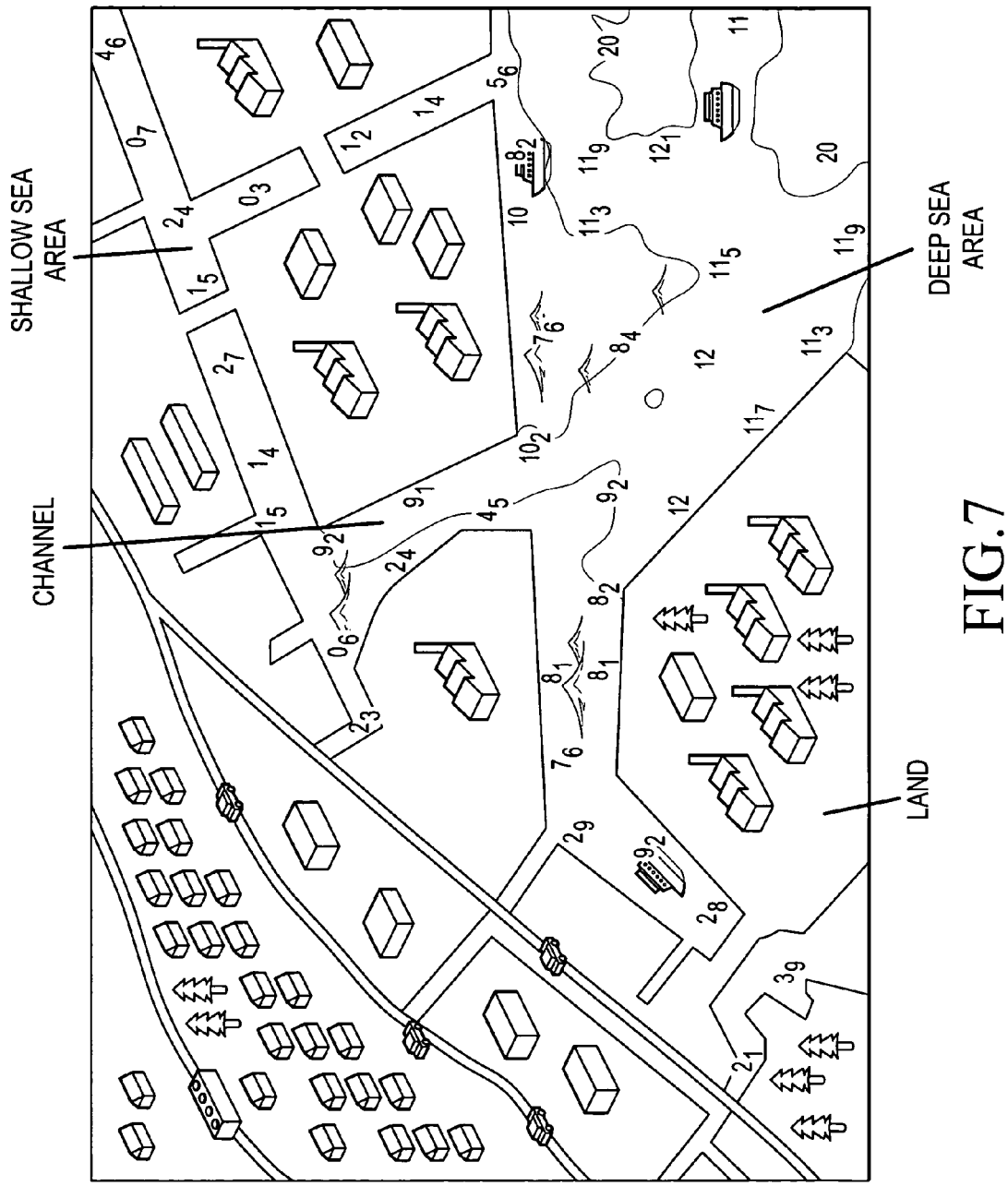
FIG. 7 is an exemplary view of an aerial photo overlaid on a chart by a navigation system according to an embodiment of the present invention.

FIGS. 6 and 7 are example views of aerial photos overlaid on charts in according to embodiments of the present invention illustrated in FIGS. 2A and 2B. The serial photo of FIG. 3 and the chart of FIG. 4 are blended to obtain FIGS. 6 and 7. The land areas in FIGS. 6 and 7 illustrate the corresponding portions of the aerial photo in FIG. 3. Deep sea areas in FIGS. 6 and 7 illustrate corresponding portions from the chart in FIG. 4. The half-dot meshing area in FIG. 6 illustrates the blended area of a photo and a chart.

The shallow sea areas in FIGS. 6 and 7 are obtained by assigning intermediate transparency values to the aerial photo in FIG. 3 and the chart in FIG. 4 using various algorithms. Channels (which are relatively deep water areas) located along sea coasts (which are globally shallow water areas) are clearly identified in FIGS. 6 and 7. As illustrated in FIG. 7, aerial photo artifacts are not present in the deep sea areas.

The methods and apparatuses of the present invention obtain images by blending two or more layers, using pixel-associated data such as depth or altitude. Other data associated with pixels may also be used. The images such obtained may be used in survey systems, such as in a GPS plotter for marine use.

Methods and apparatuses of the present invention are applicable to a variety of navigational images including aerial photos, charts, satellite photos, geographic photos, maps, atmospheric, planetary or other type of chart displaying properties associated with locations on a chart, etc. Multiple photos, charts, maps, and other imaging data associated with a displayed area may be blended using methods and apparatuses of the present invention, to clearly display a multitude of data on a blended image.

Although detailed embodiments and implementations of the present invention have been described above, it should be apparent that various modifications are possible without departing from the spirit and scope of the present invention.

We claim:
1. An image processing method, said method comprising:
   accessing data representing a first image layer, data representing a second image layer, and data representing a first data layer, where the first data layer includes an associated depth or altitude value for a location corresponding to each pixel in the first image layer or the second image layer; and
   generating a blended area, having a plurality of regions, by blending the first and second image layers based on a transparency factor associated with each region, the transparency factor corresponding to the transparency of said first image layer relative to the transparency of said second image layer, wherein the transparency factor associated with a first region varies as a function of the depth or altitude values of the first data layer, the transparency factor associated with a second region is a first fixed transparency factor, and the transparency factor associated with a third region is a second fixed transparency factor different from the first fixed transparency factor.

2. The image processing method as recited in claim 1, wherein said first image layer or said second image layer is a chart, and said second region corresponds to a land area, said first region corresponds to a part of a sea area, and said third region corresponds to a sea area not including the sea area of said first region.

3. The image processing method as recited in claim 1, wherein said first data layer is accessed from a database of data associated with pixels in said first or second layer.

4. The image processing method as recited in claim 3, wherein said database of data is a database of depth values generated from information obtained from said first or second layer.

5. The image processing method as recited in claim 1, wherein said step of generating a blended area uses alpha blending technology, wherein alpha values for pixels are calculated with an algorithm that is a linear function or other mathematical function that uses a depth or altitude database for pixels' depths or altitudes.

6. The image processing method as recited in claim 1, wherein said first image layer is an aerial or satellite photo and said second image layer is a chart, and said plurality of regions in the blended area correspond to at least a portion of the photo over a land area, a portion of the chart over a deep sea area, and the first region is obtained from the photo and the chart in a shallow sea area, said shallow sea area being a sea area having a depth which is smaller than a predetermined value, and said deep sea area being a sea area having a depth which is at least the predetermined value.

7. The image processing method as recited in claim 6, wherein said shallow sea area is an area between 0 meters and approximately 10 meters deep.

8. The image processing method as recited in claim 6, wherein areas of relatively deep water, located along seacoasts which also include regions of shallow water, are identified on said blended area, wherein said relatively deep water has a depth which is at least a predetermined value, and said shallow water has a depth which is smaller than the predetermined value.

9. The image processing method as recited in claim 1, wherein said first and second image layers are geo-referenced layers.

10. The image processing method as recited in claim 1, wherein said first image layer is a satellite photo or an aerial photo, and said second image layer is a chart layer represented in vector or raster form.

11. The image processing method as recited in claim 1, wherein said first image layer is a layer in a photograph, and said second image layer is a layer in a chart.

12. The image processing method as recited in claim 1, wherein said first image layer or said second image layer is a chart, and said second region corresponds to a land area, and said first and third regions correspond to a sea area.

13. The image processing method as recited in claim 12, wherein said first image layer is a photo and said second image layer is a chart, and said second fixed transparency factor for said third region is set such that the transparency in the first image layer is 0% and the transparency in the second image layer is 100%.

14. The image processing method as recited in claim 12, wherein said first image layer is a photo, and said second image layer is a chart.

15. The image processing method as recited in claim 1, wherein said variable transparency factor associated with said first region varies between said first fixed transparency factor and said second fixed transparency factor.

16. The image processing method as recited in claim 1, wherein said first region corresponds to a shallow sea area, said shallow sea area being a sea area having a depth which is smaller than or equal to a predetermined value.

17. An image processing apparatus, said apparatus comprising:

an input device, including a processor, configured to access data representing a first image layer, data representing a second image layer, and data representing a first data layer, where the first data layer includes an associated depth or altitude value for a location corresponding to each pixel in the first image layer or the second image layer; and a blending processing device, including a processor, configured to generate a blended area, having a plurality of regions, by blending the first and second image layers based on a transparency factor associated with each of the plurality of regions, the transparency factor corresponding to the transparency of said first image layer relative to the transparency of said second image layer, wherein the transparency factor associated with a first region varies as a function of the depth or altitude values of the first data layer, the transparency factor associated with a second region is a first fixed value, and the transparency factor associated with a third region is a second fixed value different from the first fixed value.

18. The apparatus as recited in claim 17, wherein said first image layer or said second image layer is a chart, and said second region corresponds to a land area, said first region corresponds to part of a sea area, and said third region corresponds to a sea area not including the sea area of said first region.

19. The apparatus as recited in claim 17, wherein said first data layer is accessed from a database of data associated with pixels in said first or second layer.

20. The apparatus as recited in claim 19, wherein said database of data is a database of depth values generated from information obtained from said first or second layer.

21. The apparatus as recited in claim 17, wherein said blending processing device uses alpha blending technology, wherein alpha values for pixels are calculated with an algorithm that is a linear function or other mathematical function that uses a depth or altitude database for pixels' depths or altitudes.

22. The apparatus as recited in claim 17, wherein said first image layer is an aerial or satellite photo and said second image layer is a chart, and said plurality of regions correspond to at least a portion of the photo over a land area, a portion of the chart over a deep sea area, and the first region is obtained from the photo and the chart in a shallow sea area, said shallow sea area being a sea area having a depth which is smaller than a predetermined value, and said deep sea area being a sea area having a depth which is at least the predetermined value.

23. The apparatus as recited in claim 22, wherein said shallow sea area is an area between 0 meters and approximately 10 meters deep.

24. The apparatus as recited in claim 22, wherein areas of relatively deep water, located along seacoasts which also include regions of shallow water, are identified on said blended area, wherein said relatively deep water has a depth which is at least a predetermined value, and said shallow water has a depth which is smaller than the predetermined value.

25. The apparatus as recited in claim 17, wherein said first and second image layers are geo-referenced layers.

26. The apparatus as recited in claim 17, wherein said first image layer is a satellite photo or an aerial photo, and said second image layer is a chart layer represented in vector or raster form.

27. The apparatus as recited in claim 17, wherein said first image layer is a layer in a photograph, and said second image layer is a layer in a chart.

28. The apparatus as recited in claim 17, wherein said first image layer or said second image layer is a chart, and said second region corresponds to a land area, and said first and third regions correspond to a sea area.

29. The apparatus as recited in claim 28, wherein said first image layer is a photo and said second image layer is a chart, and said second transparency factor for said third region is set such that the transparency in the first image layer is 0% and the transparency in the second image layer is 100%.

30. The apparatus as recited in claim 28, wherein said first image layer is a photo, and said second image layer is a chart.

31. The apparatus as recited in claim 17, wherein said variable transparency factor in said first region varies between said first transparency factor and said second transparency factor.

32. The apparatus as recited in claim 17, wherein
said first region corresponds to a shallow sea area, said shallow sea area being a sea area having a depth which is smaller than or equal to a predetermined value.

33. The apparatus as recited in claim 17, wherein said first image layer or said second image layer is a chart, and said blending processing device obtains a blended area from said first and second image layers based on an alpha value derived from depth values associated with pixels in said first and second image layers.

\* \* \* \* \*